United States Patent
Drappel et al.

(10) Patent No.: US 7,985,286 B2
(45) Date of Patent: Jul. 26, 2011

(54) SOLID INKS WITH LOWER COEFFICIENT OF FRICTION

(75) Inventors: Stephan V. Drappel, Mississauga (CA); Wolfgang G. Wedler, Tualatin, OR (US); Peter G. Odell, Mississauga (CA); Christopher A. Wagner, Toronto (CA)

(73) Assignee: Xerox Corporation, Norwalk, CT (US)

( * ) Notice: Subject to any disclaimer, the term of this patent is extended or adjusted under 35 U.S.C. 154(b) by 234 days.

(21) Appl. No.: 12/276,931

(22) Filed: Nov. 24, 2008

(65) Prior Publication Data

US 2010/0130657 A1 May 27, 2010

(51) Int. Cl.
C09D 11/00 (2006.01)

(52) U.S. Cl. .................. 106/31.29; 106/31.61; 524/227; 347/100

(58) Field of Classification Search .............. 106/31.29, 106/31.61; 347/100; 524/227
See application file for complete search history.

(56) References Cited

U.S. PATENT DOCUMENTS

| | | |
|---|---|---|
| 3,145,222 A | 8/1964 | Brace |
| 3,226,449 A | 12/1965 | Blanchard et al. |
| 4,058,573 A | 11/1977 | Knell |
| 4,830,671 A | 5/1989 | Frihart et al. |
| 4,889,560 A | 12/1989 | Jaeger et al. |
| 4,889,761 A | 12/1989 | Titterington et al. |
| 5,122,187 A | 6/1992 | Schwarz et al. |
| 5,194,638 A | 3/1993 | Frihart et al. |
| 5,195,430 A | 3/1993 | Rise |
| 5,231,135 A | 7/1993 | Machell et al. |
| 5,372,852 A | 12/1994 | Titterington et al. |
| 5,389,958 A | 2/1995 | Bui et al. |
| 5,597,856 A | 1/1997 | Yu et al. |
| 5,621,022 A | 4/1997 | Jaeger et al. |
| 5,782,966 A | 7/1998 | Bui et al. |
| 6,174,937 B1 | 1/2001 | Banning et al. |
| 6,221,137 B1 | 4/2001 | King et al. |
| 6,303,185 B1 | 10/2001 | Banning et al. |
| 6,309,453 B1 | 10/2001 | Banning et al. |
| 6,472,523 B1 | 10/2002 | Banning et al. |
| 6,476,219 B1 | 11/2002 | Duff et al. |
| 6,481,840 B1 | 11/2002 | Mueller et al. |
| 6,576,747 B1 | 6/2003 | Carlini et al. |
| 6,576,748 B1 | 6/2003 | Carlini et al. |
| 6,590,082 B1 | 7/2003 | Banning et al. |
| 6,646,111 B1 | 11/2003 | Carlini et al. |
| 6,663,703 B1 | 12/2003 | Wu et al. |
| 6,673,139 B1 | 1/2004 | Wu et al. |
| 6,696,552 B2 | 2/2004 | Mayo et al. |
| 6,713,614 B2 | 3/2004 | Carlini et al. |
| 6,726,755 B2 | 4/2004 | Titterington et al. |
| 6,755,902 B2 | 6/2004 | Banning et al. |
| 6,821,327 B2 | 11/2004 | Jaeger et al. |
| 6,858,070 B1 | 2/2005 | Wong et al. |
| 6,860,930 B2 | 3/2005 | Wu et al. |
| 6,872,243 B2 * | 3/2005 | Breton et al. .............. 106/31.29 |
| 6,906,118 B2 | 6/2005 | Goodbrand et al. |
| 6,958,406 B2 | 10/2005 | Banning et al. |
| 7,053,227 B2 | 5/2006 | Jaeger et al. |
| 7,186,762 B2 | 3/2007 | Wong et al. |
| 7,293,868 B2 | 11/2007 | Odell et al. |
| 7,294,730 B2 | 11/2007 | Banning et al. |
| 7,311,768 B2 | 12/2007 | Wu et al. |
| 7,381,254 B2 | 6/2008 | Wu et al. |
| 7,381,831 B1 | 6/2008 | Banning et al. |
| 7,407,539 B2 | 8/2008 | Wu et al. |
| 7,427,323 B1 | 9/2008 | Birau et al. |
| 2004/0261656 A1 * | 12/2004 | Wu et al. ............ 106/31.29 |
| 2007/0120911 A1 * | 5/2007 | Wu et al. ............ 347/88 |
| 2008/0098927 A1 | 5/2008 | Allen et al. |
| 2008/0098929 A1 | 5/2008 | Turek et al. |

FOREIGN PATENT DOCUMENTS

| | | |
|---|---|---|
| GB | 1114782 | 5/1968 |
| WO | WO 91/03523 | 3/1991 |

OTHER PUBLICATIONS

STN structure search results (Aug. 17, 2010).*
Conte et al. Journal of Fluorine Chemistry 128 (2007), 493-499.*
Turberg et al., "Semifluorinated Hydrocarbons: Primitive Surfactant Molecules," *J Am. Chem., Soc.*, vol. 110, 1988, pp. 7797-7801.
Rabolt et al., "Structural Studies or Semifluorinated n-Alkanes. 1. Synthesis and Characterization of $F(CF_2)_n(CH_2)_mH$ in the Solid State," *Macromolecules*, vol. 17, 1984, pp. 2786-2794.
Viney et al., "Liquid Crystalline Phases Formed by Iodine Derivatives of Semifluorinated Alkanes," *Mol. Cryst. Liq. Cryst.*, vol. 182B, 1990, pp. 291-297.
Viney et al., "Transitions to Liquid Crystalline Phases in a Semifluorinated Alkane," *Mol. Cryst. Liq. Cryst.*, vol. 168, 1989, pp. 63-82.
Brace, "Free-Radical Addition of Iodoperfluoroalkanes to Terminal Alkadienes. Relative Reactivity as a Function of Chain Length and Reaction Conditions," *J. Org. Chem.*, vol. 38 No. 18, 1973, pp. 3167-3172.
Mahler et al., "Smectic Liquid Crystal from (Perfluorodecyl)decane," *Mol. Cryst. Liq. Cryst.* vol. 2(3-4), 1985, pp. 111-119.
Dorset, "Binary Phase Behavior of Perfluoroalkanes," *Macromolecules*, vol. 23, 1990, pp. 894-901.
Napoli, "Diblock and Triblock Semifluorinated n-alkanes: Preparations, Structural Aspects and Applications," *Journal of Fluorine, Chemistry*, vol. 79, 1996, pp. 59-69.

* cited by examiner

*Primary Examiner* — David Wu
*Assistant Examiner* — Vu A Nguyen
(74) *Attorney, Agent, or Firm* — Oliff & Berridge, PLC

(57) ABSTRACT

A phase change ink that includes a colorant and a phase change ink carrier. The phase change ink carrier includes a diblock or tri-block co-oligomer wax of the formula $H_3C(CH_2)_m(CX_1X_2)_nCX_3X_4X_5$, or $CX_3X_4X_5(CX_1X_2)_nH_2C(CH_2)_m(CX_1X_2)_nCX_3X_4X_5$, wherein at least one of $X_1$, $X_2$, $X_3$, $X_4$ and $X_5$ are atoms selected from group VII of the periodic table and any remaining one of $X_1$, $X_2$, $X_3$, $X_4$ and $X_5$ are hydrogen, wherein m is an integer of from about 5 to about 50, and wherein n is an integer of from about 3 to about 40. The phase change ink has a property of the phase change ink of providing a surface of a printed portion of the ink having a lower coefficient of friction to glass if the diblock co-oligomer wax was not included in the ink formulation.

25 Claims, No Drawings

SOLID INKS WITH LOWER COEFFICIENT OF FRICTION

BACKGROUND

This application relates to solid phase change ink jet inks, and in particular to a solid phase change ink jet ink comprising a colorant and an ink carrier, wherein the ink carrier includes at least a partially halogenated diblock or triblock co-oligomer wax. The inclusion of the partially halogenated diblock or triblock co-oligomer wax in the ink carrier reduces the surface energy of the ink and reduces the coefficient of friction between the solid ink and another surface, especially glass. The phase change inks are suitable for ink jet printing processes.

Automatic document feed (ADF) through feed of commercial copiers is a performance characteristic which is highly desired and expected of any kind of printing device, including those devices that use a hot-melt (or phase change) solid ink. Unfortunately, due to the above-ambient temperature conditions in printing device feeding mechanisms, and the softness of the solid ink used in these printing devices, prints made by solid ink office printing devices often struggle to meet customer expectations on this performance property.

Certain hot-melt inks, such as those described in U.S. Pat. No. 7,381,254 and U.S. Pat. No. 7,311,768, which are herein incorporated by reference in their entirety, contain non-polar, linear long-chain synthetic paraffinic waxes in an amount of 40 to 60 percent by weight of the hot-melt ink. These inks typically exhibit a high molecular weight and an improved ADF through feed because of the lower tack, lower coefficient of frictions and higher hardness caused by the paraffinic waxes' higher degree of wax-induced crystallinity.

A more energy-conserving office printing technology is desirable. From the perspective of the hot-melt ink, energy conservation can be achieved by decreasing the molecular weight of the paraffinic wax in the ink carrier to lower the melting point of the ink. Such inks are commonly referred to as low-energy inks, such as those described in U.S. Pat. No. 6,860,930 and U.S. Pat. No. 7,294,730, which are herein incorporated by reference in their entirety. Although the inclusion of the lower molecular weight paraffinic wax will reduce the melting point of the ink, such waxes may be much softer and may impart a much higher plasticity and coefficient of friction than a higher molecular weight ink. As such, the inclusion of a lower molecular weight paraffinic wax may result in an ink that does not possess an optimum ADF performance characteristic.

REFERENCES

Ink jet printing processes may employ inks that are solid at room temperature, for example about 20° C. to about 27° C., and liquid at elevated jetting temperatures, for example of about 60° C. or more. Such inks are typically referred to as hot melt inks or phase change inks.

In thermal ink jet printing processes employing a phase change ink, the substantially solid ink is melted by the heater in the printing apparatus and utilized (that is, jetted) as a liquid in a manner similar to that of conventional thermal ink jet printing. Upon contact with the printing substrate, the molten ink solidifies rapidly, desirably solidifying at a rate enabling the colorant to substantially remain on the surface of the substrate instead of being carried into the substrate (for example, paper) by capillary action, thereby enabling higher print density than is generally obtained with liquid inks. Advantages of a phase change ink in ink jet printing thus include elimination of potential spillage of the ink during handling, a wide range of print density and quality, minimal paper cockle or distortion, and enablement of indefinite periods of nonprinting without the danger of nozzle clogging, even without capping the nozzles.

U.S. Patent Application Publication No. 2008/0098929, incorporated herein by reference in its entirety, describes a phase change ink having an ink carrier, at least one colorant, at least one triamide and at least one bis-urethane. The at least one triamide and at least one bis-urethane assist in dispersing colorants, such as pigments like carbon black, in non-polar ink carriers.

U.S. Patent Application Publication No. 2008/0098927, incorporated herein by reference in its entirety, describes a pigmented phase change ink composition comprising an ink carrier, a dispersing agent, and pigment particles. The ink can be resistant to substantial aggregation and settling of the pigment particles in the melt and even when exposed to freeze thaw cycles.

U.S. Pat. No. 7,407,539, incorporated herein by reference in its entirety, describes a phase change ink comprising (a) a colorant and (b) a phase change ink carrier, said carrier comprising (i) a branched triamide and (ii) a polyethylene wax having an average peak molecular weight of from about 350 to about 730, a polydispersity of from about 1.03 to about 3.0, and an asymmetrical molecular weight distribution skewed toward the high molecular weight end.

U.S. Pat. No. 7,293,868, incorporated herein by reference in its entirety, describes ink compositions that include one or more radiation curable oil soluble components and one or more thermal solvents, as well as methods of preparing such ink compositions and methods of using such ink compositions.

U.S. Pat. No. 6,860,930, incorporated herein by reference in its entirety, describes a phase change ink composition comprising (a) a colorant and (b) a carrier comprising a polyamide, wherein the polyamide component of the carrier contains at least about 10 percent by weight of a branched triamide.

U.S. Pat. No. 6,481,840, incorporated herein by reference in its entirety, describes a method of reducing the coefficient of friction or improving the writeability of a phase change ink printed media comprising: toning a surface of a transfix drum of a phase change ink inkjet printer with fine particles; jetting a phase change ink onto the surface of the transfix drum over the fine particles; and transferring the phase change ink and fine particles from the transfix drum to media to produce the phase change ink printed media coated with the fine particles.

U.S. Pat. No. 6,303,185, incorporated herein by reference in its entirety, describes a phase change carrier composition made from the combination of at least one urethane resin; at least one urethane/urea resin; at least one mono-amide; and at least one polyethylene wax are disclosed. The order of addition of the reactants to form the reactant product urethane resin and urethane/urea resin permits the tailoring or design engineering of desired properties.

U.S. Pat. No. 6,174,937, incorporated herein by reference in its entirety, describes a phase change ink comprising a material of the formula $R_1COX_1R_2X_2COR_3COX_3R_4X_4COR_5$ wherein $X_1$, $X_2$, $X_3$ and $X_4$ are segments comprising atoms selected from groups V and VI of the periodic table; wherein at least one $R_1$ and $R_5$ comprises at least 37 carbon units; and wherein $R_2$, $R_3$ and $R_4$ each comprise at least one carbon unit.

SUMMARY

There is therefore a need, addressed by the subject matter disclosed herein, for a phase change ink composition that maintains and enhances the ADF performance characteristic, but also is suitable within the framework of low-energy solid ink formulation.

The above and other issues are addressed by the present application, wherein in embodiments, the application relates a phase change ink containing a colorant and a phase change ink carrier comprised of a diblock or triblock co-oligomer wax. The block co-oligomer wax is where a paraffinic hydrocarbon chain is chemically bound to at least a partially halogenated or fully halogenated hydrocarbon chain. The diblock co-oligomer wax is where a paraffinic hydrocarbon chain is chemically bound to one partially halogenated or fully halogenated hydrocarbon chain. The triblock co-oligomer wax is where a paraffinic hydrocarbon chain is chemically bound to two partially halogenated or fully halogenated hydrocarbon chains. The paraffinic hydrocarbon chain is miscible in other non-polar waxes, such as polyethylene waxes, that are typically included in an ink carrier. As the partially halogenated hydrocarbon chain and the fully halogenated hydrocarbon chain are not typically miscible with ordinary hydrocarbons, such as a polyethylene wax typically found in phase change solid inks, the inclusion of the partially halogenated hydrocarbon chain and the fully halogenated hydrocarbon chain in the ink carrier reduces adhesion and tack of the surface ink to another surface, such as glass and hardens the surface of ink to reduce the coefficient of friction, In embodiments, described is a phase change ink comprising (a) a colorant and (b) a phase change ink carrier, the carrier comprising a diblock or tri-block co-oligomer wax of the formula $H_3C(CH_2)_m(CX_1X_2)_nCX_3X_4X_5$, or $CX_3X_4X_5(CX_1X_2)_nH_2C(CH_2)_m(CX_1X_2)_n CX_3X_4X_5$, wherein at least one of $X_1$, $X_2$, $X_3$, $X_4$ and $X_5$ are atoms selected from group VII of the periodic table and any remaining one of $X_1$, $X_2$, $X_3$, $X_4$ and $X_5$ are hydrogen, wherein m is an integer of from about 5 to about 50, and wherein n is an integer of from about 3 to about 40.

In further embodiments, described is a phase change ink comprising (a) a colorant and (b) a phase change ink carrier, the carrier comprising a diblock or tri-block co-oligomer wax of the formula $H_3C(CH_2)_m(CX_1X_2)_nCX_3X_4X_5$, or $CX_3X_4X_5(CX_1X_2)_nH_2C(CH_2)_m(CX_1X_2)_nCX_3X_4X_5$, wherein at least one of $X_1$, $X_2$, $X_3$, $X_4$ and $X_5$ are atoms selected from group VII of the periodic table and any remaining one of $X_1$, $X_2$, $X_3$, $X_4$ and $X_5$ are hydrogen, wherein m is an integer of from about 5 to about 50, and wherein n is an integer of from about 3 to about 40, wherein having a property of the phase change ink providing a surface of a printed portion of the ink having a lower coefficient of friction to glass if the diblock co-oligomer wax was not included in the ink formulation.

In further embodiments, described is a phase change ink comprising (a) a colorant, (b) a branched triamide, (c) a polyethylene wax, (d) a monoamide, (e) an isocyanate derived material, (f) a triglyceride of hydrogenated abietic acid and (g) a phase change ink carrier, the carrier comprising a diblock or tri-block co-oligomer wax of the formula $H_3C(CH_2)_m(CX_1X_2)_nCX_3X_4X_5$, or $CX_3X_4X_5(CX_1X_2)_nH_2C(CH_2)_m (CX_1X_2)_n CX_3X_4X_5$, wherein at least one of $X_1$, $X_2$, $X_3$, $X_4$ and $X_5$ are atoms selected from group VII of the periodic table and any remaining one of $X_1$, $X_2$, $X_3$, $X_4$ and $X_5$ are hydrogen, wherein m is an integer of from about 5 to about 50, and wherein n is an integer of from about 3 to about 40, wherein having a property of the phase change ink providing a surface of a printed portion of the ink having a lower coefficient of friction to glass if the diblock co-oligomer wax was not included in the ink formulation.

In still further embodiments, described is a phase change ink with a static coefficient of friction less than 0.375.

EMBODIMENTS

Described herein are phase change inks comprised of (a) a colorant and (b) a phase change ink carrier, the carrier comprising a diblock or tri-block co-oligomer wax of the formula $H_3C(CH_2)_m(CX_1X_2)_nCX_3X_4X_5$, or $CX_3X_4X_5 (CX_1X_2)_n H_2C(CH)_m(CX_1X_2)_n CX_3X_4X_5$, wherein at least one of $X_1$, $X_2$, $X_3$, $X_4$ and $X_5$ are atoms selected from group VII of the periodic table and any remaining one of $X_1$, $X_2$, $X_3$, $X_4$ and $X_5$ are hydrogen, wherein m is an integer of from about 5 to about 50, including, for example, such as from about 9 to about 50, from about 17 to about 40, or from about 25 to about 35, and wherein n is an integer of from about 3 to about 40, including, for example, such as from about 5 to about 25, from about 5 to about 18, from about 7 to about 15, or from about 10 to about 14. Such ink carriers are beneficial in lowering the surface energy of the ink and, in turn, lowering the coefficient of friction between the solid ink surface against other surfaces, especially glass surfaces such as those used in automated document feed (ADF) scanners of commercial xerographic reproduction systems than if the diblock co-oligomer wax was not included in the ink carrier formulation.

In this regard, all of the inks suitable for use may be characterized as low energy inks. Low energy inks are solid at a temperature below about 40° C. and have a viscosity of from about 5 to about 15 centipoise at a jetting temperature of from about 80° C. to about 150° C., for example from about 90° C. to about 130° C. or from about 110° C. to about 120° C.

The diblock co-oligomer wax or the triblock co-oligomer wax in the carrier may act as a phase change agent in the ink. Specifically, the ink controls the phase change by being solid at room temperature and molten at jetting temperatures. The wax thus promotes the increase in viscosity of the ink as it cools from the jetting temperature, for example from about 75° C. to about 150° C., to the substrate temperature, which is for example about 20° C. to about 65° C.

In embodiments, the diblock co-oligomer wax or the tri-block co-oligomer wax is comprised of a paraffinic hydrocarbon wax chain chemically linked to a partially halogenated hydrocarbon wax chain. A paraffinic hydrocarbon wax chain, such as those described in the below embodiments, is a linear, non-polar hydrocarbon molecule comprised of may contain from about 6 to about 200 carbon atoms, including, for example, from about 6 to about 100 carbon atoms, from about 6 to about 50 carbon atoms, from about 12 to about 45 carbon atoms, from about 18 to about 40 carbon atoms, from about 12 to about 35 carbon atoms or from about 18 to about 30 carbon atoms.

Because the paraffinic hydrocarbon wax chain has a dipole moment equal to or close to zero, it considered to be a hydrophobic molecule. As such, the paraffinic hydrocarbon wax chain is immiscible in the other molten ink components, such as polyethylene waxes, that are typically found in phase change solid inks. Examples of paraffinic waxes may include synthetic polyethylene waxes such as, for example, POLYWAX® or VYBAR™ manufactured by Baker-Petrolite, or IGI 1230A or IGI 1250A manufactured by The International Group, Inc. (IGI), as well as microcrystalline waxes such as the MICROSERE series manufactured by The International Group, Inc. (IGI), WAXREX from ExxonMobil and BARECO™ waxes, manufactured by Baker-Petrolite.

In embodiments, the diblock co-oligomer wax or the triblock co-oligomer wax may contain either a partially halogenated hydrocarbon wax chain or a fully halogenated hydrocarbon wax chain. As described herein, a "partially halogenated hydrocarbon wax chain" is a hydrocarbon wax chain in which the hydrogen atoms are partially, but not fully, substituted with at least one halogen atom, and in which the hydrocarbon wax chain retains one or more hydrogen atoms. As described herein, a "fully halogenated hydrocarbon wax chain" is a hydrocarbon wax chain in which all hydrogen atoms are substituted entirely with halogen atoms and in which thus the hydrocarbon wax chain thus includes no hydrogen atoms.

The halogen in the halogenated hydrocarbon waxes may be any atom selected from Group VII of the periodic table, such as, for example, fluorine, chlorine, bromine, iodine, or combinations thereof. The partially halogenated hydrocarbon chain or the fully halogenated hydrocarbon chain, such as those described in the below embodiments, is a linear or branched hydrocarbon molecule that is either partially or fully substituted with a halogen, and may contain from about 3 to about 40 carbon atoms, including, for example, from about 6 to about 30 carbon atoms, from about 8 to about 25 carbon atoms, from about 10 to about 18 carbon atoms or from about 12 to about 18 carbon atoms.

Halogenated hydrocarbon wax chains, such as fluorinated waxes, are also hydrophobic as the paraffinic hydrocarbon wax chain, but have a much lower surface energy than paraffinic waxes. From the point of view of coefficient of friction (COF), the low surface energy of halogenated hydrocarbon waxes is desirable because it can (1) reduce adhesion and tack of the surface ink to another surface, such as glass and (2) harden the surface of ink to reduce the COF. Furthermore, halogenated hydrocarbon wax chains are considered to be lipophobic as they are not typically miscible with ordinary hydrocarbons, such as a polyethylene wax typically found in phase change solid inks.

The wax diblock or triblock co-oligomers may be categorized as an amphiphilic semi-halogenated wax, which is similar to surfactants. Surfactants are compounds that, when applied in very low concentrations, form films on the surface of a liquid and, in turn, may reduce the surface tension of a liquid. For example, the surfactant properties for semi-fluorinated alkanes in n-alkane solvents was described in P. M. Turberg et al., Semi-fluorinated hydrocarbons: Primitive surfactant molecules, J. Am. Chem. Soc. 110, 7797 (1988).

Numerous synthetic routes exist to make the diblock co-oligomer wax or the triblock co-oligomer wax. The wax diblock co-oligomer may be produced by reacting an α-olefin, a perfluoroalkyl iodide under a nitrogen atmosphere, and a radical initiator, such as, for example, AIBN, at about 90° C. The resulting perfluoroalkyl-iodo-alkyl adduct is then dehalogenated to provide the perfluoroalkyl-block-alkyl co-oligomer. Details of the above process are described in the following patents and publications: U.S. Pat. No. 4,058,573; U.S. Pat. No. 3,145,222; U.S. Pat. No. 3,226,449; Rabolt et al., Macromolecules 17 (1984) pp. 2786-2794; Viney et al., Mol. Cryst. Liq. Cryst. 182B (1990), pp. 291-297; Viney et al., Mol. Cryst. Liq. Cryst. 168 (1989) pp. 63-82; Brace, J. Org. Chem., Vol. 38, No. 18 (973) pp. 3167-3172; W. Mahler, et al., Mol. Cryst. Liq. Cryst. 2 (3-4) (1985) pp. 111-119. and D. L. Dorset, Macromolecules 23 (1990) pp. 894-901, each of which is incorporated herein by reference in its entirety. Additional methods of producing the wax diblock co-oligomer includes the processes described in GB 1 114 782, which is incorporated herein by reference in its entirety. Commercial examples of the wax diblock co-oligomer may include TOKO® High Fluoro Pink, manufactured by Toko Inc. and SPEKTRA® High Fluoro Pink, manufactured by Spektra Inc.

Similarly, the triblock co-oligomer wax can be manufactured by combining a di-iodo terminated perfluoroalkyl compound with an alpha-olefin in the presence of a free radical initiator. Details of the above process for making the triblock co-oligomer wax is described in M. Napoli, Journal of Fluorine Chemistry 79 (1996) pp. 59-69, which is incorporated herein by reference in its entirety.

The partially or fully halogenated hydrocarbon chain, due to its lipophobic nature, "phase separates" from the volume phase of the liquid ink and is driven toward accumulation on the surface of the ink to reduce the surface energy of the ink upon solidification, especially when present as a surface film of a sufficiently high degree of coverage. This phase separation may be caused by the increased concentration caused by the accumulation of the partially or fully halogenated hydrocarbon wax chains on the liquid/air surface of the paraffin wax chain. As the concentration of the partially or fully halogenated hydrocarbon wax chains begins to reach a critical point, similar to the critical micelle concentration (CMC) for surfactants, molecular aggregates or micelles may begin to form that may decrease the surface energy (surface tension) of the phase change ink. Furthermore, the surface concentration of the partially halogenated hydrocarbon wax chains on the liquid/air surface does not change upon the solidification of the of the wax/resin mixture contained in the phase-change ink.

The wax diblock or triblock co-oligomers may be present in the ink carrier in an amount of at least 20 weight percent of the ink carrier, such as for example, from at least about 0.01 weight percent to about 20 weight percent of the ink carrier, from at least 1 weight percent to about 20 weight percent of the ink carrier, from at least 2 weight percent to about 15 weight percent of the ink carrier, from at least 2 weight percent to about 10 weight percent of the ink carrier and from at least 5 weight percent to about 10 weight percent of the ink carrier.

Other suitable materials can be included in the ink carrier along with the diblock co-oligomer wax or the triblock co-oligomer wax described above. Examples of other materials may include n-paraffins, ester waxes, fatty acids and other waxy materials, fatty amide containing materials, sulfonamide materials, ethylene/propylene copolymers, urethane derivatives of oxidized synthetic or petroleum waxes, highly branched hydrocarbons, typically prepared by olefin polymerization, fatty amides, such as monoamides, triamides, tetra-amides, mixtures thereof, and the like, for example such as described in U.S. Pat. No. 6,858,070 and U.S. Pat. No. 7,381,254, incorporated herein by reference in their entirety, high molecular weight linear alcohols, hydrocarbon-based waxes, such as the homopolymers of polyethylene available from Baker-Petrolite and of the general formula

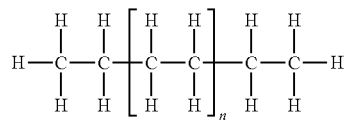

wherein x is an integer of from about 1 to about 200, such as from about 5 to about 150 or from about 12 to about 105, and modified maleic anhydride hydrocarbon adducts of polyolefins prepared by graft copolymerization.

The melting point of the polyethylene wax may be from about 50° C. to about 130° C. from about 60° C. to about 120° C., from about 70° C. to about 110° C. from about 70° C. to about 105° C., and from about 80° C. to about 90° C. Further, the polyethylene wax may be present in the ink in any amount, such as, for example at least 10% to about 95% by weight of the ink carrier, at least about 15% to about 80% by weight of the ink carrier, at least about 25% to about 70% by weight of the ink carrier, at least about 30% to about 70% by weight of the ink carrier, and at least about 40% to about 65% by weight of the ink carrier.

Additional examples of other additional materials that may be include in the ink carrier along with the diblock co-oligomer wax described herein include rosin esters; polyamides; dimer acid amides; fatty acid amides, including ARAMID C; epoxy resins, such as EPOTUF 37001, available from Riechold Chemical Company; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides, including KETJENFLEX MH and KETJENFLEX MS80; benzoate esters, such as BENZOFLEX S552, available from Velsicol Chemical Company; phthalate plasticizers; citrate plasticizers; maleate plasticizers; sulfones, such as diphenyl sulfone, n-decyl sulfone, n-arnyl sulfone, chlorophenyl methyl sulfone; polyvinyl pyrrolidinone copolymers; polyvinyl pyrrolidone/polyvinyl acetate copolymers; novolac resins, such as DUREZ 12 686, available from Durez Corporation; and natural product waxes, such as beeswax, monton wax, candelilla wax, GILSONITE (American Gilsonite Company), and the like; mixtures of linear primary alcohols with linear long chain amides or fatty acid amides, such as those with from about 6 to about 24 carbon atoms, including PARICIN 9 (propylene glycol monohydroxystearate), PARICIN 13 (glycerol monohydroxystearate), PARICIN 15 (ethylene glycol monohydroxystearate), PARICIN 220 (N(2-hydroxyethyl)-12-hydroxystearamide), PARICIN 285 (N,N'-ethylene-bis-12-hydroxystearamide), FLEXRICIN 185 N,N'-ethylene-bis-ricinoleamide), available from Vertellus and the like. Further, linear long chain sulfones with from about 4 to about 16 carbon atoms, such as n-propyl sulfone, n-pentyl sulfone, n-hexyl sulfone, n-heptyl sulfone, n-octyl sulfone, n-nonyl sulfone, n-decyl sulfone, n-undecyl sulfone, n-dodecyl sulfone, n-tridecyl sulfone, n-tetradecyl sulfone, n-pentadecyl sulfone, n-hexadecyl sulfone, and the like, are suitable ink carrier materials.

In addition, the ink carriers described in U.S. Pat. No. 6,906,118, incorporated herein by reference, may also be used. Also suitable as ink carriers are liquid crystalline materials as disclosed in, for example, U.S. Pat. No. 5,122,187, the disclosure of which is totally incorporated herein by reference.

The ink may also include therein at least one optional triamide. Suitable triamides for use herein include linear triamides, which are molecules where all three amide groups are drawn in the same molecular chain or branch. Examples of linear triamides include those triamides having the following formulas:

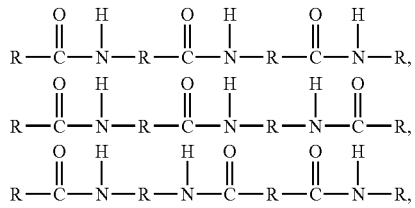

R can be any hydrocarbon having from about 1 to about 200, carbon atoms, such as from about 25 to 150 carbon atoms or from about 30 to about 100 carbon atoms.

Linear triamides can further include those wherein a line can be drawn through the three amide groups, even if one would ordinarily draw a different line. One example of such a triamide can be expressed by the following formula:

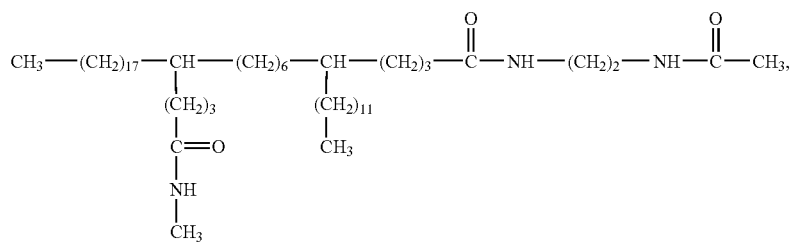

which can also be drawn as:

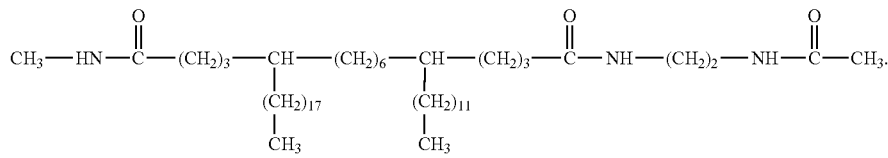

In embodiments, the triamide may also be a branched triamide. Examples of suitable branched triamides include those triamides disclosed in U.S. Pat. No. 6,860,930, which is incorporated herein in its entirety by reference. Any branched triamide disclosed in U.S. Pat. No. 6,860,930, is suitable for use herein. Examples of branched triamides suitable for use herein include those having the formulas:

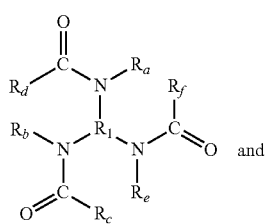

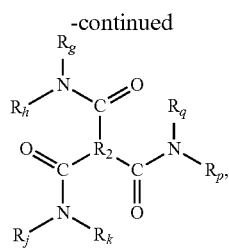

and the like are disclosed in U.S. Pat. No. 6,860,930. In such branched triamides, $R_1$ and $R_2$ may be (i) an alkylene group (including linear branched, saturated, unsaturated, cyclic, substituted, and unsubstituted alkylene groups, and wherein hetero atoms, such as oxygen, nitrogen, sulfur, silicon, phosphorus, and the like either may or may not be present in the alkylene group), having from about 3 carbon atoms to about 200 carbon atoms, such as from about 15 carbon atoms to about 150 carbon atoms or from about 21 carbon atoms to about 100 carbon atoms, although the number of carbon atoms can be outside of these ranges, (ii) an arylene group (including unsubstituted and substituted arylene groups, and wherein hetero atoms, such as oxygen, nitrogen, sulfur, silicon, phosphorus, and the like either may or may not be present in the arylene group), having from about 6 carbon atoms to about 200 carbon atoms, such as from about 10 carbon atoms to about 150 carbon atoms or from about 14 carbon atoms to about 100 carbon atoms, although the number of carbon atoms can be outside of these ranges, (iii) an arylalkylene group (including unsubstituted and substituted arylalkylene groups, wherein the alkyl portion of the arylalkylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkylene group), having from about 7 carbon atoms to about 200 carbon atoms, such as from about 8 carbon atoms to about 150 carbon atoms or from about 9 carbon atoms to about 100 carbon atoms, although the number of carbon atoms can be outside of these ranges, such as benzylene or the like, or (iv) an alkylarylene group (including unsubstituted and substituted alkylarylene groups, wherein the alkyl portion of the alkylarylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylarylene group), having from about 7 carbon atoms to about 200 carbon atoms, such as from about 8 carbon atoms to about 150 carbon atoms or from about 9 carbon atoms to about 100 carbon atoms, although the number of carbon atoms can be outside of these ranges, such as tolylene or the like. $R_a$, $R_b$, $R_c$, $R_g$, $R_h$, $R_j$, $R_k$, $R_p$ and $R_q$ may each independently be (i) a hydrogen atom, (ii) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in embodiments from about 1 carbon atoms to about 200 carbon atoms, such as from about 6 carbon atoms to about 150 carbon atoms or from about 10 carbon atoms to about 100 carbon atoms, although the number of carbon atoms can be outside of these ranges, (iii) an aryl group (including unsubstituted and substituted aryl groups, and wherein hetero atoms, such as oxygen, nitrogen, sulfur, silicon, phosphorus, and the like either may or may not be present in the aryl group), having from about 6 carbon atoms to about 200 carbon atoms, such as from about 10 carbon atoms to about 150 carbon atoms or from about 14 carbon atoms to about 100 carbon atoms, although the number of carbon atoms can be outside of these ranges, (iv) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), having from about 6 carbon atoms to about 200 carbon atoms, such as from about 7 carbon atoms to about 150 carbon atoms or from about 8 carbon atoms to about 100 carbon atoms, although the number of carbon atoms can be outside of these ranges, such as benzyl or the like, or (v) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), having from about 6 carbon atoms to about 200 carbon atoms, such as from about 7 carbon atoms to about 150 carbon atoms or from about 8 carbon atoms to about 100 carbon atoms, although the number of carbon atoms can be outside of these ranges, such as tolyl or the like. $R_d$, $R_e$ and $R_f$ may each independently be (i) an alkyl group as described above, (ii) an aryl group as described above, (iii) an arylalkyl group as described above, or (iv) an alkylaryl group as described above.

The optional triamide may be present in the ink carrier in amounts of from about 2 weight percent to about 50 weight percent, such as from about 5 weight percent to about 18 weight percent or from about 8 weight percent to about 13 weight percent of the ink.

Additional examples of suitable phase change ink carrier materials are monoamides, tetra-amides, mixtures thereof, and the like. Specific examples of suitable fatty amide ink carrier materials include stearyl stearamide, such as KEMAMIDE S-180, available from Crompton Corporation, Greenwich, Conn., and the like. Further information on fatty amide carrier materials is disclosed in, for example, U.S. Pat. Nos. 4,889,560, 4,889,761, 5,194,638, 4,830,671, 6,174,937, 5,372,852, 5,597,856, 6,174,937, and WO 91/03523, the disclosures of each of which are herein incorporated herein by reference in entirety.

The monoamide may be present in the ink carrier in an amount at least 2 percent by weight of the carrier to about 90 percent by weight of the carrier, from about 10 percent by weight of the carrier to about 70 percent by weight of the carrier, from about 15 percent by weight of the carrier to about 50 percent by weight of the carrier and from about 20 percent by weight of the carrier to about 45 percent by weight of the carrier.

The ink of embodiments may further include conventional additives to take advantage of the known functionality associated with such conventional additives. Such additives may include, for example, at least one isocyanate derived material, antioxidant, defoamer, slip and leveling agents, clarifier, tackifier, adhesive, plasticizer and the like.

The ink carrier may also include at least one isocyanate derived material. The isocyanate derived material may be a urethane resin obtained by reacting two equivalents of an alcohol, such as hydroabietyl alcohol and one equivalent of an isocyanate or diisocyanate (isophorone diisocyanate), as disclosed in, for example, Example 1 of U.S. Pat. No. 5,782,966, the disclosure of which is totally incorporated herein by reference in its entirety. The isocyanate derived material may be present in the ink carrier at least about 2% by weight of the ink carrier, such as for example from about 2 to about 99% by weight of the ink carrier, from about 2 to about 90% by weight of the ink carrier, from about 3 to about 80% by weight of the ink carrier, from about 5 to about 60% of the ink carrier, from abut 10 to about 50% by weight of the ink carrier, and from about 10 to about 30% by weight of the ink carrier. Other suitable isocyanate-derived materials include a urethane resin that was the adduct of three equivalents of stearyl isocyanate and a glycerol-based alcohol, prepared as described in Example 4 of U.S. Pat. No. 6,309,453, the disclosure of which is totally incorporated herein by reference in its entirety.

The ink may optionally contain antioxidants to protect the images from oxidation and also may protect the ink components from oxidation while existing as a heated melt in the ink reservoir. Examples of suitable antioxidants include (1) N,N'-hexamethylene bis(3,5-di-tert-butyl-4-hydroxy hydrocinnamamide) (IRGANOX 1098, available from Ciba Inc.), (2) 2,2-bis(4-(2-(3,5-di-tert-butyl-4-hydroxyhydrocinnamoyloxy))ethoxyphenyl)propane (TOPANOL-205, available from ICI America Corporation), (3) tris(4-tert-butyl-3-hydroxy-2,6-dimethyl benzyl) Isocyanurate (CYANOX 1790, 41, 322-4, LTDP, Aldrich D12,840-6), (4) 2,2'-ethylidene bis(4,6-di-tert-butylphenyl)fluoro phosphonite (ETHANOX-398, available from Ethyl Corporation), (5) tetrakis(2,4-di-tert-butylphenyl)-4,4'-biphenyl diphosphonite (ALDRICH 46,852-5; hardness value 90), (6) pentaerythritol tetrastearate (TCI America #PO739), (7) tributylammonium hypophosphite (Aldrich 42,009-3), (8) 2,6-di-tert-butyl-4-methoxyphenol (Aldrich 25,106-2), (9) 2,4-di-tert-butyl-6-(4-methoxybenzyl)phenol (Aldrich 23,008-1), (10) 4-bromo-2,6-dimethylphenol (Aldrich 34,951-8), (11) 4-bromo-3,5-didimethylphenol (Aldrich B6,420-2), (12) 4-bromo-2-nitrophenol (Aldrich 30,987-7), (13) 4-(diethyl aminomethyl)-2,5-dimethylphenol (Aldrich 14,668-4), (14) 3-dimethylaminophenol (Aldrich ID14,400-2), (15) 2-amino-4-tert-amylphenol (Aldrich 41,258-9), (16) 2,6-bis (hydroxymethyl)-p-cresol (Aldrich 22,752-8), (17) 2,2'-methylenediphenol (Aldrich B4,680-8), (18) 5-(diethylamino)-2-nitrosophenol (Aldrich 26,951-4), (19) 2,6-dichloro-4-fluorophenol (Aldrich 28,435-1), (20) 2,6-dibromo fluoro phenol (Aldrich 26,003-7), (21) α-trifluoro-o-creso-1 (Aldrich 21,979-7), (22) 2-bromo-4-fluorophenol (Aldrich 30,246-5), (23) 4-fluorophenol (Aldrich F1,320-7), (24) 4-chlorophenyl-2-chloro-1,1,2-tri-fluoroethyl sulfone (Aldrich 13,823-1), (25) 3,4-difluoro phenylacetic acid (Adrich 29,043-2), (26) 3-fluorophenylacetic acid (Aldrich 24,804-5), (27) 3,5-difluoro phenylacetic acid (Aldrich 29,044-0), (28) 2-fluorophenylacetic acid (Aldrich 20,894-9), (29) 2,5-bis (trifluoromethyl) benzoic acid (Aldrich 32,527-9), (30) ethyl-2-(4-(4-(trifluoromethyl)phenoxy)phenoxy)propionate (Aldrich 25,074-0), (31) tetrakis (2,4-di-tert-butyl phenyl)-4,4'-biphenyl diphosphonite (Aldrich 46,852-5), (32) 4-tert-amyl phenol (Aldrich 15,384-2), (33) 3-(2H-benzotriazol-2-yl)-4-hydroxy phenethylalcohol (Aldrich 43,071-4), NAUGARD 76, NAUGARD 445, NAUGARD 512, AND NAUGARD 524 (manufactured by Chemtura Corporation), and the like, as well as mixtures thereof. The antioxidant, when present, may be present in the ink in any desired or effective amount, such as from about 0.25 percent to about 10 percent by weight of the ink or from about I percent to about 5 percent by weight of the ink.

The ink may further contain an optional tackifier such as FORAL 85, a glycerol ester of hydrogenated abietic (rosin) acid (commercially available from Eastman), FORAL 105, a pentaerythritol ester of hydroabietic (rosin) acid (commercially available from Eastman), CELLOLYN 21, a hydroabietic (rosin) alcohol ester of phthalic acid (commercially available from Eastman), ARAKAWA KE-311 and KE-100 Resins, triglycerides of hydrogenated abietic (rosin) acid (commercially available from Arakawa Chemical Industries, Ltd.), synthetic polyterpene resins such as NEVTAC 2300, NEVTAC 100, and NEVTACO 80 (commercially available from Neville Chemical Company), WINGTACK 86, a modified synthetic polyterpene resin (commercially available from Sartomer), and the like. Tackifiers may be present in the ink in any effective amount, such as from about 0.01 percent by weight of the ink to from about 98 percent by weight of the ink, from about 0.1 percent by weight of the ink to about 50 percent by weight of the ink, from about 5 weight percent of the ink to about 10 weight percent of the ink.

Adhesives, such as VERSAMID 757, 759, or 744 (commercially available from Cognis) may be present in the ink from about 0.01 percent by weight of the ink to from about 98 percent by weight of the ink, from about 0.1 percent by weight of the ink to about 50 percent by weight of the ink, from about 5 weight percent of the ink to about 10 weight percent of the ink.

Plasticizers such as UNIPLEX 250 (commercially available from Unitex), the phthalate ester plasticizers commercially available from Ferro under the trade name SANTICIZER, such as dioctyl phthalate, diundecyl phthalate, alkylbenzyl phthalate (SANTICIZER 278), triphenyl phosphate (commercially available from Ferro), KP-140, a tributoxyethyl phosphate (commercially available from Great Lakes Chemical Corporation), MORFLEX 150, a dicyclohexyl phthalate (commercially available from Morflex Chemical Company Inc.), trioctyl trimellitate (commercially available from Sigma Aldrich Co.), and the like. Plasticizers may be present in an amount from about 0.01 percent by weight of the ink to from about 98 percent by weight of the ink, from about 0.1 percent by weight of the ink to about 50 percent by weight of the ink, from about 5 weight percent of the ink to about 10 weight percent of the ink.

When present, the optional additives may each, or in combination, be present in the ink in any desired or effective amount, such as from about 1 percent to about 10 percent by weight of the ink or from about 3 percent to about 5 percent by weight of the ink.

In embodiments, the phase change ink compositions described herein also include a colorant. Any desired or effective colorant can be employed in the phase change ink compositions, including dyes, pigments, mixtures thereof, and the like, provided that the colorant can be dissolved or dispersed in the ink carrier. Any dye or pigment may be chosen, provided that it is capable of being dispersed or dissolved in the ink carrier and is compatible with the other ink components. The phase change carrier compositions can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Ciba); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol Brilliant Yellow 4GF (Clariant); Cibanon Yellow 2GN (Ciba); Orasol Black CN (Ciba); Savinyl Black RLSN (Clariant); Pyrazol Black BG (Clariant); Morfast Black 101 (Rohm & Haas); Diaazol Black RN (ICI); Orasol Blue GN (Ciba); Savinyl Blue GLS (Clariant); Luxol Fast Blue MBSN (Pylam Products); Sevron Blue 5GMF (Classic Dyestuffs); Basacid Blue 750 (BASF), Neozapon Black X51 (BASF), Classic Solvent Black 7 (Classic Dyestuffs), Sudan Blue 670 (C.I. 61554) (BASF), Sudan Yellow 146 (C.I. 12700) (BASF), Sudan Red 462 (C.I. 26050) (BASF), C.I.

Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like, Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Pigments are also suitable colorants for the phase change inks. Examples of suitable pigments include PALIOGEN Violet 5100 (commercially available from BASF); PALIOGEN Violet 5890 (commercially available from BASF); HELIOGEN Green L8730 (commercially available from BASF); LITHOL Scarlet D3700 (commercially available from BASE); SUNFAST Blue 15:4 (commercially available from Sun Chemical); Hostaperm Blue B2G-D (commercially available from Clariant); Hostaperm Blue B4G (commercially available from Clariant); Permanent Red P-F7RK; Hostaperm Violet BL (commercially available from Clariant); LITHOL Scarlet 4440 (commercially available from BASF); Bon Red C (commercially available from Dominion Color Company); ORACET Pink RE (commercially available from Ciba); PALIOGEN Red 3871 K (commercially available from BASF); SUNFAST Blue 15:3 (commercially available from Sun Chemical); PALIOGEN Red 3340 (commercially available from BASF); SUNFAST Carbazole Violet 23 (commercially available from Sun Chemical); LITHOL Fast Scarlet L4300 (commercially available from BASE); SUNBRITE Yellow 17 (commercially available from Sun Chemical); HELIOGEN Blue L6900, L7020 (commercially available from BASF); SUNBRITE Yellow 74 (commercially available from Sun Chemical); SPECTRA PAC C Orange 16 (commercially available from Sun Chemical); HELIOGEN Blue K6902, K6910 (commercially available from BASF); SUNFAST Magenta 122 (commercially available from Sun Chemical); HELIOGEN Blue D6840, D7080 (commercially available from BASF); Sudan Blue OS (commercially available from BASE); NEOPEN Blue FF4012 (commercially available from BASF); PV Fast Blue B2GO1 (commercially available from Clariant); IRGALITE Blue BCA (commercially available from Ciba); PALIOGEN Blue 6470 (commercially available from BASE); Sudan Orange G (commercially available from Aldrich), Sudan Orange 220 (commercially available from BASF); PALIOGEN Orange 3040 (BASF); PALIOGEN Yellow 152, 1560 (commercially available from BASF); LITHOL Fast Yellow 0991 K (commercially available from BASE); PALIOTOL Yellow 1840 (commercially available from BASF); NOVOPERM Yellow FGL (commercially available from Clariant); Ink Jet Yellow 4G VP2532 (commercially available from Clariant); Toner Yellow HG (commercially available from Clariant); Lumogen Yellow D0790 (commercially available from BASE); Suco-Yellow L1250 (commercially available from BASF); Suco-Yellow D1355 (commercially available from BASF); Suco Fast Yellow D1355, D1351 (commercially available from BASF); HOSTAPERM Pink E 02 (commercially available from Clariant); Hansa Brilliant Yellow 5GX03 (commercially available from Clariant); Permanent Yellow GRL 02 (commercially available from Clariant); Permanent Rubine L6B 05 (commercially available from Clariant); FANAL Pink D4830 (commercially available from BASF); CINQUASIA Magenta (commercially available from DU PONT); PALIOGEN Black L0084 (commercially available from BASF); Pigment Black K801 (commercially available from BASF); and carbon blacks such as REGAL 330™ (commercially available from Cabot), Nipex 150 (commercially available from Degusssa) Carbon Black 5250 and Carbon Black 5750 (commercially available from Columbia Chemical), and the like, as well as mixtures thereof.

Also suitable are the colorants disclosed in U.S. Pat. Nos. 6,472,523, 6,726,755, 6,476,219, 6,576,747, 6,713,614, 6,663,703, 6,755,902, 6,590,082, 6,696,552, 6,576,748, 6,646,111, 6,673,139, 6,958,406, 6,821,327, 7,053,227, 7,381,831 and U.S. Pat. No. 7,427,323, the disclosures of each of which are incorporated herein by reference in their entirety.

In embodiments, solvent dyes are employed. An example of a solvent dye suitable for use herein may include spirit soluble dyes because of their compatibility with the ink carriers disclosed herein. Examples of suitable spirit solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 260501] (BASF), mixtures thereof and the like.

The colorant may be present in the phase change ink in any desired or effective amount to obtain the desired color or hue such as, for example, at least from about 0.1 percent by weight of the ink to about 50 percent by weight of the ink, at least from about 0.2 percent by weight of the ink to about 20 percent by weight of the ink, and at least from about 0.5 percent by weight of the ink to about 10 percent by weight of the ink.

In embodiments, the ink carriers for the phase change inks may have melting points of from about 60° C. to about 150° C., for example from about 80° C. to about 120° C., from about 85° C. to about 110° C., from about 100° C. to about 110° C., or from about 105° C. to about 110° C. as determined by, for example, observation and measurement on a microscope hot stage, wherein the binder material is heated on a glass slide and observed by microscope. Higher melting points are also acceptable, although printhead life may be reduced at temperatures higher than 150° C. Furthermore, low energy inks have a jetting viscosity of about 9 cP to about 13 cP, such as from about 10 cP to about 11 cP, from about 10.25 cP to about 10.75 cP or from about 10.45 cP to about 10.85 cP, at melting points of about 107° C. to about 111° C.

The ink compositions can be prepared by any desired or suitable method. For example, each of the components of the ink carrier can be mixed together, followed by heating, the mixture to at least its melting point, for example from about 60° C. to about 150° C., 80° C. to about 120° C. and 85° C. to about 110° C. The colorant may be added before the ink ingredients have been heated or after the ink ingredients have been heated. When pigments are the selected colorants, the molten mixture may be subjected to grinding in an attritor or ball mill apparatus to effect dispersion of the pigment in the ink carrier. The heated mixture is then stirred for about 5 seconds to about 10 minutes or more, to obtain a substantially homogeneous, uniform melt, followed by cooling the ink to ambient temperature (typically from about 20° C. to about 25° C.). The inks are solid at ambient temperature. In a specific embodiment, during the formation process, the inks in their molten state are poured into molds and then allowed to cool and solidify to form ink sticks. Suitable ink preparation techniques are disclosed in U.S. Pat. No. 7,186,762, the disclosure of which is incorporated herein by reference in its entirety.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX 4200 papers, XEROX Image Series papers, Courtland 4024 DP paper, ruled notebook paper, bond paper, silica coated papers such as Sharp Company silica coated paper, JuJo paper, HAMMERMILL LASERPRINT paper, and the like, transparency materials, fabrics, textile products, plastics, polymeric films, inorganic substrates such as metals and wood, and the like.

The inks described herein are further illustrated in the following examples. All parts and percentages are by weight unless otherwise indicated.

Friction testing measurements can be taken to determine whether the solid inks containing a co-oligomer wax comprised of a paraffinic hydrocarbon and a perfluorinated hydrocarbon chain possessed the required ADF performance characteristic. These friction testing measurements include: static coefficient of friction, kinetic coefficient of friction, friction plasticity performance index and friction stick-slip index.

The friction testing measurements are determined with a Thwing-Albert Friction/Peel Tester, which uses a 2 kilogram load cell in a horizontal plane assembly, as described in ASTM standards D1894, D4518 and G115 and TAPPI Standard TAPPI T 549 pm-90. Sample pieces of the substrate with the printed ink, typically measuring 2.5 inches by 2.5 inches, are affixed face-down to the silicone rubber-cushioned flat bottom of a 230 gram sled. Each sample piece is dragged horizontally at a speed of 2 inches per minute for about 10 seconds across the stationary surface of Thwing-Albert Friction/Peel Tester. The stationary surface is a removable component of the Thwing-Albert Friction/Peel Tester and may be comprised of either glass or a different piece of the same printed substrate comprising the same ink as the sample piece. The 2 kilogram load cell measured the tangential force required to initiate the movement of sled (static coefficient of friction) and maintain movement of the sled (kinetic coefficient of friction) across the horizontal surface.

Coefficient of friction (COF) measures the difficulty with which the surface of one material will slide over an adjoining surface of itself or another matter. Furthermore, COF is the ratio of the frictional force that is acting parallel or tangential to the two surfaces in contact to the perpendicular or normal force of the two surfaces in contact. Often the perpendicular or normal force is gravity.

In the Friction Test Trials described below, COF data are obtained by continuously measuring the frictional force as a function of time during the course of individual tests, in each of which the sled travels a total distance of about 0.9 cm. Using the above mentioned definition of COF data, and knowing the speed of the sled, a series of COF values as a function of sled displacement results. Static COF, kinetic COF, friction plasticity performance index, and friction stick-slip index are then obtained from this data series by application of the following definitions. As such, the COF data consists of numerous measurements of the force at distinct moments in time as the sled completes a "run" and travels across the desired distance (0.9 cm) the adjoining surface.

The static COF is the ratio of the maximum tangential force required to resist the initial motion of the sled on the stationary surface to the normal force. The static COF is the maximum value of all of the COF data obtained in a single run before a sled displacement of 0.257 cm, wherein the sled travels a total distance of about 0.9 cm. A static coefficient of friction less than 0.375 is desirable.

The kinetic COF is defined as the ratio of the average force required to sustain the uniform relative movement of the sled across a stationary surface to the normal force. The kinetic COF is the average value of all of the COF data for a single run that is acquired after a sled displacement of 0.257 cm, wherein the sled travels a total distance of about 0.9 cm.

Friction stick-slip index (FSSI) is an empirical parameter that quantitatively measures the magnitude of stick-slip behavior, and as such also describes the "tackiness" of the surfaces. Stick-slip behavior is an undesirable behavior that prevents an accurate determination of the kinetic COF and appears most often where at least one surface is particularly adhesive, soft or plastic. Specifically, stick-slip behavior is defined as the ink sample "sticking" to the stationary surface and then "slipping" suddenly across the stationary surface. The FSSI is calculated by sliding an ink sample 5 times across the same spot on a stationary surface to determine the kinetic COF. Then, by taking the logarithm (base 10) of the maximum local amplitude of the kinetic COF for a moving window for a series of data points, the average of the 5 numbers is taken and reported as FSSI. For reference, the magnitude of the FSSI is directly proportional to the intensity of the stick-slip, and may have values anywhere between −0.6 and 2.5. Within this interval, values between −0.6 and 0.5 indicate the absence of any stick-slip. Furthermore, values between 0.5 and 1.0 indicate a possibility of stick-slip with a high-frequency stick-slip possible at the lower end. Still further, values between 1.0 and 2.5 signify a definite presence of stick-slip, where aging processes of the ink on the media will not remove the stick-slip, if FSSI values are greater than 1.5. To a large extent, FSSI correlates directly to ADF performance, where high FSSI values indicates low ADF performance and low FSSI values indicate improved ADF performance.

Friction plasticity performance index (FPPI) is an empirical parameter that quantitatively describes the softness or plasticity of various surfaces using the kinetic COF value. Due to the softness of many types of inks, the COF does not remain constant, but steadily increases while the ink sample piece slides across the stationary surface. However, an increase in the kinetic COF does not necessarily lead to stick-slip behavior. The FPPI is determined by sliding a sample 5 times across the same spot of the stationary surface to determine the kinetic COF and inputting the values into the following equation:

$$FPPI = \frac{1}{\left(1 + \frac{\frac{1}{4}\sum_{i=2}^{5}(kin \cdot COF)_i - (kin \cdot COF)_1}{(kin \cdot COF)_1}\right)} \quad (1)$$

where $(kin\ COF)_i$ is the kinetic coefficient of friction value of the i-th measurement. As a reference, FPPI values are typically between 0 and 1.5, with 1.0 representing a totally elastic, hard surface. FPPI values smaller than 1.0 indicate a plastic, soft surface where the kinetic COF is steadily increasing. FPPI values greater than or equal to 1.0 are desired as such values indicate hardening of the ink or no change (fully elastic behavior) during the sliding process.

EXAMPLES

Formulation of Example Inks 1-7

Seven sample low-energy inks were prepared (Examples 1-7) with an ink carrier containing varying concentrations of a polyethylene wax (paraffinic hydrocarbon wax), a fluorinated hydrocarbon wax (halogenated hydrocarbon wax) and additional components. Each of the seven sample low-energy inks were submitted for print tests. The brand names of the fluorinated hydrocarbon waxes used in each of the Examples were either TOKO® High Fluoro Pink and SPEKTRA® High Fluoro Pink, which are commercially available ski waxes that have similar thermal properties.

Example 1 was comprised of a reference low-energy cyan ink comprised of a stearyl stearamide wax (KEMAMIDE S180 wax from Crompton Corp.,) KE-100 resin (triglycerides of hydrogenated abietic (rosin) acid from Arakawa Chemical Industries Ltd.), NAUGARD N445 antioxidant from Crompton Corp, a branched triamide wax of the formula

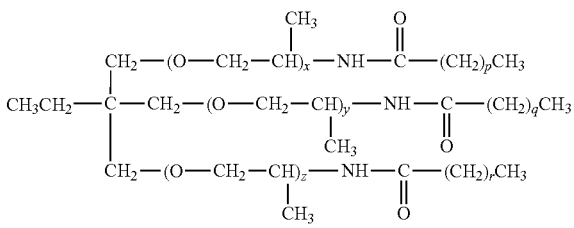

wherein p, q, and r each have an average value of about 35, prepared as described in Example II of U.S. Pat. 6,860,930, the disclosure of which is totally incorporated herein by reference, an un-branched polyethylene wax comprised of about around 38 carbon atoms and derived from POLYWAX 500, obtained from Baker Petrolite, but distilled to remove about 15 percent of the lower molecular weight fraction and about 15 percent of the upper molecular weight fraction, $M_p=582$, $M_n=562$, $M_w=579$, MWD=1.03 as measured by HT-GPC and described in U.S. Pat. No. 7,407,539, a urethane resin that was the adduct of three equivalents of stearyl isocyanate and a glycerol-based alcohol, prepared as described in Example 4 of U.S. Pat. No. 6,309,453, the disclosure of which is totally incorporated herein by reference and a cyan dye prepared as disclosed in U.S. Pat. No. 6,472,523, the disclosure of which is totally incorporated herein by reference. Examples 2-4 were comprised of the same low-energy ink as Example 1 except that Examples 2-4 comprised the additional component of 2.5 weight percent, 5.0 weight percent or 10.0 weight percent, respectively, of the TOKO® fluorinated wax (available from Mammut Sports Group, Shelbourne Vt.). Examples 5-7 were comprised of the same low-energy ink as Example 1 except that Examples 5-7 comprised the additional component of 2.5 weight percent, 5.0 weight percent or 10.0 weight percent, respectively, of the SPEKTRA® fluorinated wax (available from Vauhti Speed OY, Joensuu Finland). Table 1 summarizes the compositions of Examples 1-7.

TABLE 1

| | Composition of Examples 1-7 | | | | | | |
|---|---|---|---|---|---|---|---|
| | Example 1 (Reference) | Example 2 | Example 3 | Example 4 | Example 5 | Example 6 | Example 7 |
| Polyethylene Wax | 52.94 | 51.63 | 50.20 | 47.80 | 51.63 | 50.20 | 47.80 |
| Branched Triamide | 14.82 | 14.46 | 14.10 | 13.00 | 14.46 | 14.10 | 13.00 |
| S-180 | 14.25 | 13.90 | 13.57 | 12.90 | 13.90 | 13.57 | 12.90 |

TABLE 1-continued

Composition of Examples 1-7

|  | Example 1 (Reference) | Example 2 | Example 3 | Example 4 | Example 5 | Example 6 | Example 7 |
|---|---|---|---|---|---|---|---|
| KE-100 | 13.42 | 13.07 | 12.78 | 12.15 | 13.07 | 12.78 | 12.15 |
| Resin #12 | 0.90 | 0.87 | 0.86 | 0.82 | 0.87 | 0.86 | 0.82 |
| N-445 | 0.16 | 0.15 | 0.15 | 0.14 | 0.15 | 0.15 | 0.14 |
| Cyan Colorant | 3.51 | 3.42 | 3.34 | 3.19 | 3.42 | 3.34 | 3.19 |
| TOKO High Fluoro Pink | — | — | — | — | 2.50 | 5.00 | 10.00 |
| SPEKTRA High Fluoro Pink | — | 2.50 | 5.00 | 10.00 | — | — | — |

As illustrated above in Table 1, the weight percentages of each of the seven ink components in the low-energy ink described in Example 1 was proportionately reduced to account for the addition of the fluorinated waxes of Examples 2-7.

The inks compositions of Examples 1-7 were prepared by the following process. All ink ingredients except the colorant were charged into a stainless steel beaker. The resulting mixture was then melted together at a temperature of about 110° C. in an oven, followed by blending by stirring in a temperature controlled mantle at about 110° C. for 15 minutes. To this mixture was then added the cyan colorant. After stirring for about 2 additional hours, the resulting mixture comprised of all eight ink ingredients was filtered through a heated MOTT® apparatus (obtained from Mott Metallurgical) using Whatman #3 filter paper under a pressure of about 15 pounds per square inch. The filtered phase change ink then was poured into molds and cooled to room temperature overnight to form solid ink sticks.

Ink Characteristics

The viscosity ($\eta$ centipoise) of Examples 1-7 was measured by a Rheometrics RFS3 mechanical spectrometer equipped with a cone-plate geometry at 110° C. (the temperature of operation for low-energy ink) and the viscosities of the inks in Examples 1-7 are summarized below in Table 2.

TABLE 2

Ink Viscosities of Examples 1-7 at 110° C.

| Example Ink | Viscosity (cP) |
|---|---|
| Example 1 (Reference) | 10.72 |
| Example 2 | 10.68 |
| Example 3 | 10.62 |
| Example 4 | 10.55 |
| Example 5 | 10.68 |
| Example 6 | 10.62 |
| Example 7 | 10.55 |

As shown above in Table 2, the viscosities of inks for Examples 1-7 are within the range of 10.65±0.20 cP at the 110° C. temperature of operation and can be used in a low-energy ink printing device. However, the inclusion of the 10% TOKO® High Fluoro Pink in Example 7 was too soft and could not be jetted out of a solid ink inkjet printer. As such, the friction measurements for Example 7 could not be obtained.

Friction Testing

Friction Testing Trial 1: Friction Measurement of Ink Samples Against the Exact Same Ink Samples at Ambient Temperature The inks from Examples 1-6 were each placed in a PHASER 8400 solid ink inkjet printer and printed onto HAMMERMILL 24 pound Laser Print Paper to generate a 100% cyan solid fill print samples. During printing, printing operating conditions for Examples 1-6 such as drop mass, drum temperature, preheat temperature, transfix speed, transfix pressure and print resolution were kept constant.

To perform an initial measurement of the friction properties of the inks described in Examples 1-6, each of the inks were first tested against themselves. First, the 100% cyan solid fill print samples containing the ink from Example 1 were firmly affixed, with the printing side facing upward, to the stationary horizontal plane of a Thwing-Albert Friction/Peel Tester interfaced to a personal computer running "Talas" 3.0 software. Next, a 2.5"×2.5" sample piece was cut from a 100% cyan solid fill print sample of the same ink as Example 1 and placed on the flat bottom side of a 230 gram sled. Subsequently, the 230 gram sled with the 2.5"×2.5" cyan solid fill print sample was moved directly over the surface of the stationary print 5 times and the tangential force was measured. The ambient air temperature surrounding the sample during the test remained constant at 23° C. and the relative humidity also remained constant at 35%. The above described procedure was repeated for Examples 2-6. During above procedure for Examples 1-6, high-frequency, low-intensity stick-slip behavior was observed in all cases. From the tangential force data, the mean static coefficient of friction (COF), the mean kinetic COF, the FPPI value and the mean FSSI value was calculated for Examples 1-6 and is summarized below in Table 3.

TABLE 3

Summary of Mean Static COF, Mean Kinetic COF, FPPI and Mean FSSI for Friction Testing Trial 1

| Example Ink | Mean Static COF | Mean Kinetic COF | FPPI | Mean FSSI | Days After Printing |
|---|---|---|---|---|---|
| Example 1 (Reference) | 0.235 | 0.184 | 1.059 | 0.29 | 8 |
| Example 2 | 0.247 | 0.168 | 1.130 | 0.42 | 7 |
| Example 3 | 0.217 | 0.163 | 1.123 | 0.46 | 8 |
| Example 4 | 0.237 | 0.170 | 1.117 | 0.53 | 6 |
| Example 5 | 0.240 | 0.176 | 1.132 | 0.41 | 6 |
| Example 6 | 0.265 | 0.187 | 1.128 | 0.42 | 6 |

Using the results for static and kinetic COF, and for the FSSI of the five individual tests in Examples 1-6, a single factor analysis of variance (ANOVA) population analysis was performed for the static COF, the kinetic COF and the FSSI. However, a single factor ANOVA population analysis could not be performed for the FPPI and an average FPPI could not be calculated because, according to the definition of FPPI described above, FPPI is not associated with any individual test, but is composed from the kinetic COF values of the five individual tests.

The days after printing were different for Examples 1-6. However, this difference is inconsequential as the coefficient of friction data will reach equilibrium in 3 to 4 days after printing, with the first twenty-four hours being the most crucial.

The calculated p-values from the single factor ANOVA population analysis are summarized in below Table 4. This Table lists p-values for the static COF, the kinetic COF, and the FSSI. Each line refers to the comparison of the Reference Ink (Example 1 in Table 3 above) with the inks from Examples 2-6. Therefore, the first column names only these inks.

TABLE 4

Single-factor ANOVA p-values of Static COF, Kinetic COF, and FSSI for Friction Testing Trial 1

| Example Ink | Static COF | Kinetic COF | FSSI |
|---|---|---|---|
| Example 2 | 0.669 | 0.015 | 0 |
| Example 3 | 0.372 | 0.003 | 0 |
| Example 4 | 0.942 | 0.023 | 0 |
| Example 5 | 0.831 | 0.184 | 0 |
| Example 6 | 0.264 | 0.584 | 0 |

Assuming a statistical significance of 5%, the calculated p-values indicate a significant decrease in kinetic COF for Examples 2-4 when compared to the Reference Ink of Example 1. Furthermore, the p-values of the FSSI indicate significant increases of this metric in all cases. This suggests a significant increase in tackiness of the print surface, as compared to the reference, while being in contact with another print surface of the same ink. Therefore, the results of the tests described above indicate the presence of an agent in the Example Inks 2-6, which significantly changes surface friction properties.

Friction Testing Trial 2: Friction Measurement of Ink Samples Against Glass Samples at Ambient Temperature The inks from Examples 1-6 were each placed in a PHASER 8400 solid ink inkjet printer and printed onto HAMMERMILL 24 pound Laser Print Paper to generate 100% cyan solid fill print samples. During printing, printing operating conditions for Examples 1-6 such as drop mass, drum temperature, preheat temperature, transfix speed, transfix pressure and print resolution were kept constant.

For characterization of the friction properties against the hard, smooth surface of a glass plate, a method has been used, that is different in data sampling from the one described in the previous Friction Testing Trial. A clean, dry and dust-free glass plate was affixed to the stationary horizontal plane of a Thwing-Albert Friction/Peel Tester interfaced to a personal computer running "Talas" 3.0 software. Next, six 2.5"×2.5" sample pieces were cut from a 100% cyan solid fill print sample of the same ink as Example 1 and the first such sample was attached to the flat bottom side of a 230 gram sled. Subsequently, the 230 gram sled with the 2.5"×2.5" cyan solid fill print sample on the bottom of sled was moved directly over the surface of the glass plate 5 times (5 runs), wherein the tangential force required to pull the sled was measured and recorded. This process was then repeated with the remaining five sample pieces of the same ink from Friction Testing Trial 2—bringing the total number of runs per Example to 30. The ambient air temperature of the test remained constant at 23° C. and the relative humidity also remained constant at 35%.

The above described procedure was repeated for Examples 2-6. From the tangential force data, the average first static coefficient of friction (COF), and the average first kinetic COF, were calculated from the six static COF values and the six kinetic COF values measured during the first run of each of the six samples of each ink. In a slightly different way, the average FPPI value and the average FSSI value were calculated from the six individual results for each metric, measured on each of the six samples for each ink. Thereby, the FSSI for each run represented the mean value from the five runs of each sample (which is synonymous to the term "mean FSSI", used in the previous Friction Testing Trial). The six inks are named Examples 1-6, and are summarized below in Table 5. The difference in naming between average first static COF and mean static COF (mentioned in the previous Friction Testing Trial) is that the latter refers to an average result of one five-run test on one sample, whereas the former refers to the average result of six five-run tests (a total of 30 runs) on six samples. The same is true for the difference in naming between average first kinetic COF and mean kinetic COF, and for the difference in naming between average FSSI and mean FSSI.

TABLE 5

Summary of Average Static COF, Average Kinetic COF, Average FPPI and Average FSSI for Friction Testing Trial 2

| Example Ink | Average First Static COF | Average First Kinetic COF | Average FPPI | Average FSSI | Days After Printing |
|---|---|---|---|---|---|
| Example 1 (Reference) | 0.408 | 0.364 | 0.716 | −0.213 | 9 |
| Example 2 | 0.369 | 0.349 | 0.770 | −0.435 | 8 |
| Example 3 | 0.365 | 0.358 | 0.771 | −0.368 | 9 |
| Example 4 | 0.324 | 0.335 | 0.810 | −0.122 | 7 |
| Example 5 | 0.383 | 0.353 | 0.758 | −0.472 | 8 |
| Example 6 | 0.363 | 0.361 | 0.790 | −0.437 | 8 |

Using the data shown above in Table 5, a single factor ANOVA population analysis was preformed for average first static COF, average first kinetic COF, average FPPI and average FSSI. The calculated p-values from the single factor ANOVA population analysis are summarized in Table 6. Each line refers to the comparison of the Reference Ink (Example 1 in Table 5) with the inks from Examples 2-6. Therefore, the first column names only these inks.

TABLE 6

Single-factor ANOVA p-values of Static COF, Kinetic COF, FPPI and FSSI for Friction Testing Trial 2

| Example Ink | Static COF | Kinetic COF | FPPI | FSSI |
|---|---|---|---|---|
| Example 2 | 0.341 | 0.848 | 0.008 | 0.051 |
| Example 3 | 0.366 | 0.944 | 0.012 | 0.155 |
| Example 4 | 0.086 | 0.704 | 0.001 | 0.624 |
| Example 5 | 0.605 | 0.896 | 0.066 | 0.030 |
| Example 6 | 0.413 | 0.969 | 0.001 | 0.108 |

Assuming a statistical significance of 5%, the calculated p-values indicated that there was no or only a minor improvement (lower COF and lower FSSI) between the reference ink (Example 1) and the tested inks (Examples 2-6) for average first static COF, average first kinetic COF and average FSSI. However, the calculated p-values indicate a significant elevation of the average FPPI values, and thus of the print surface hardness, in the inks of Examples 2-6. Thus, the inclusion of the fluorinated wax in Examples 2-6, when the printed ink samples are in contact with a glass surface at ambient temperature, significantly increases FPPI and thus improves friction performance.

Friction Testing Trial 3: Friction Measurement of Ink Samples Against Glass Samples at Median Automated Documented Feed (ADF) Temperature of Operation The inks from Examples 1-6 were each placed in a PHASER 8400 solid ink inkjet printer and printed onto HAMMERMILL 24 pound Laser Print Paper to generate 100% cyan solid fill print samples. During printing, printing operating conditions for Examples 1-6 such as drop mass, drum temperature, preheat temperature, transfix speed, transfix pressure and print resolution were kept constant.

The data sampling method for characterization of the print friction properties has been the same, as already presented and explained in the Friction Testing Trials. A clean, dry and dust-free glass plate was affixed to the stationary horizontal plane of a Thwing-Albert Friction/Peel Tester interfaced to a personal computer running "Talas" 3.0 software. The stationary glass plate was heated until a constant temperature of 32.5° C. was reached.

Next, six 2.5"×2.5" sample pieces were cut from a 100% cyan solid fill print sample of the same ink as Example 1 and the first such sample was attached to the flat bottom side of a 230 gram sled. Subsequently, the 230 gram sled with the 2.5"×2.5" cyan solid fill print sample on the bottom of the sled was moved directly over the surface of the stationary print 5 times (5 runs), wherein the tangential force required to pull the sled was measured and recorded. This process was then repeated with the remaining five sample pieces of the same ink from Example 1; bringing the total number of runs per Example to 30. The temperature of the glass surface and the relative humidity were closely monitored to remain constant at 32.5° C. and 35%, respectively. The above described procedure was repeated for Examples 2-6. From the tangential force data, the average first static coefficient of friction (COF), and the average first kinetic COF were calculated from the six static COF values and the six kinetic COF values measured during the first run of each of the six samples of each ink. In a slightly different way, the average FPPI value and the average FSSI value were calculated from the six individual results for each metric, measured on each of the six samples for each ink. Thereby, the FSSI for each run represented the mean value from the five runs of each sample (which is synonymous to the term "mean FSSI", used in the first Friction Testing Example). The six inks are named Examples 1-6 and are summarized below in Table 7.

TABLE 7

Summary of Mean Static COF, Mean Kinetic COF, FPPI and FSSI for Friction Testing Trial 3

| Example Ink | Average First Static COF | Average First Kinetic COF | Average FPPI | Average FSSI | Days After Printing |
|---|---|---|---|---|---|
| Example 1 (Reference) | 1.381 | 1.934 | 0.667 | 0.832 | 11 |
| Example 2 | 1.066 | 1.584 | 0.539 | 0.537 | 10 |
| Example 3 | 1.023 | 1.431 | 0.516 | 0.387 | 12 |
| Example 4 | 0.716 | 0.892 | 0.756 | −0.085 | 10 |
| Example 5 | 1.111 | 1.543 | 0.542 | 0.697 | 11 |
| Example 6 | 1.041 | 1.459 | 0.518 | 0.492 | 11 |

Using the data shown above in Table 7, a single factor ANOVA population analysis was preformed for average first static COF, average first kinetic COF, average FPPI and average FSSI. The calculated p-values from the single factor ANOVA population analysis are summarized in Table 8. Each line refers to the comparison of the Reference Ink (Example 1 in Table 7) with the inks from Examples 2-6. Therefore, the first column names only these inks.

TABLE 8

Single-factor ANOVA p-values of Static COF, Kinetic COF, FPPI and FSSI for Friction Testing Trial 3

| Example Ink | Static COF | Kinetic COF | FPPI | FSSI |
|---|---|---|---|---|
| Example 2 | 0.023 | 0.026 | 0.018 | 0.165 |
| Example 3 | 0.019 | 0.015 | 0.007 | 0.016 |
| Example 4 | 0.001 | 0.000 | 0.206 | 0.000 |
| Example 5 | 0.065 | 0.063 | 0.026 | 0.516 |
| Example 6 | 0.039 | 0.044 | 0.015 | 0.066 |

Assuming a statistical significance of 5%, the calculated p-values indicated that there was significant improvement between the reference ink (Example 1) and the tested inks (Examples 2-6) for all measurements. In particular, the inclusion of fluorinated wax in Examples 2-6 resulted in a significant improvement in the average first static COF and average first kinetic COF. Furthermore, with the exception of Example 4 (10 wt % Spectra High Fluoro Pink) that results in a significant hardening of the surface, the stick-slip behavior determined by the FSSI was decreased and thus improved as the concentration of fluorinated wax increased.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A phase change ink comprising (a) a colorant and (b) a phase change ink carrier, the ink carrier comprising a tri-block co-oligomer wax of the formula $CX_3X_4X_5(CX_1X_2)_n$ $H_2C(CH_2)_m(CX_1X_2)_nCX_3X_4X_5$,
wherein at least one of $X_1$, $X_2$, $X_3$, $X_4$ and $X_5$ are atoms selected from group VII of the periodic table and any remaining one of $X_1$, $X_2$, $X_3$, $X_4$ and $X_5$ are hydrogen, wherein m is an integer of from about 5 to about 50, and wherein n is an integer of from about 3 to about 40.

2. The phase change ink of claim 1, wherein $X_1$, $X_2$, $X_3$, $X_4$ and $X_5$ are fluorine atoms.

3. The phase change ink of claim 1, wherein m is an integer of from about 9 to about 50.

4. The phase change ink of claim 1, wherein m is an integer of from about 17 to about 40.

5. The phase change ink of claim 1, wherein n is an integer of from about 5 to about 25.

6. The phase change ink of claim 1, wherein n is an integer of from about 10 to about 18.

7. The phase change ink of claim 1, wherein a jetting viscosity of the ink at 110° C. is from about 9 to about 13 cP.

8. The phase change ink of claim 1, wherein a jetting viscosity of the ink at 110° C. is from about 10 to about 11 cP.

9. The phase change ink of claim 1, wherein the tri-block co-oligomer wax is present in the ink in an amount of at least about 5% by weight of the ink carrier.

10. The phase change ink of claim 1, wherein the phase change ink carrier further comprises at least one branched triamide, a polyethylene wax, a monoamide, an isocyanate derived material, and a triglyceride of hydrogenated abietic acid.

11. The phase change ink of claim 10, wherein the branched triamide is present in the ink in an amount of at least 2 to about 50% by weight of the ink carrier.

12. The phase change ink of claim 10, wherein the polyethylene wax has melting point of about 50° C. to about 130° C. and is present in the ink in an amount of at least about 10% to about 95% by weight of the ink carrier.

13. The phase change ink of claim 10, wherein the monoamide is a stearyl stearamide present in the ink in an amount of at least about 2 to about 90% by weight of the ink.

14. The phase change ink of claim 10, wherein the isocyanate derived material is a urethane resin obtained from the reaction of two equivalents of hydroabietyl alcohol and one equivalent of isophorone diisocyanate and is present in the ink in an amount of at least about 2% by weight of the ink carrier.

15. A phase change ink comprising (a) a colorant and (b) a phase change ink carrier, the ink carrier comprising a tri block co-oligomer wax of the formula $CX_3X_4X_5(CX_1X_2)_nH_2C(CH_2)_m(CX_1X_2)_nCX_3X_4X_5$,
wherein at least one of $X_1$, $X_2$, $X_3$, $X_4$ and $X_5$ are atoms selected from group VII of the periodic table and any remaining one of $X_1$, $X_2$, $X_3$, $X_4$ and $X_5$ are hydrogen, wherein m is an integer of from about 5 to about 50, and wherein n is an integer of from about 3 to about 40,
wherein a coefficient of friction of the phase change ink on a surface of a printed portion of the ink is lower than a coefficient of friction to glass if the tri-block co-oligomer wax is not included in the ink carrier.

16. The phase change ink of claim 15, wherein $X_1$, $X_2$, $X_3$, $X_4$ and $X_5$ are fluorine atoms.

17. The phase change ink of claim 15, wherein m is an integer of from about 9 to about 50.

18. The phase change ink of claim 15, wherein n is an integer of from about 5 to about 25.

19. The phase change ink of claim 15, wherein a viscosity of the ink is from about 10 to about 11 cP.

20. The phase change ink of claim 15, wherein the tri-block co-oligomer wax is present in the ink in an amount of at least about 20 weight percent of the ink carrier.

21. A phase change ink comprising (a) a colorant, (b) a branched triamide, (c) a polyethylene wax, (d) a monoamide, (e) an isocyanate derived material, (f) a triglyceride of hydrogenated abietic acid and (g) a phase change ink carrier, the ink carrier comprising a tri-block co-oligomer wax of the formula $CX_3X_4X_5(CX_1X_2)_nH_2C(CH_2)_m(CX_1X_2)_nCX_3X_4X_5$,
wherein at least one of $X_1$, $X_2$, $X_3$, $X_4$ and $X_5$ are atoms selected from group VII of the periodic table and any remaining one of $X_1$, $X_2$, $X_3$, $X_4$ and $X_5$ are hydrogen, wherein m is an integer of from about 5 to about 50, and wherein n is an integer of from about 3 to about 40,
wherein a coefficient of friction of the phase change ink on a surface of a printed portion of the ink is lower than a coefficient of friction to glass if the tri-block co-oligomer wax is not included in the ink carrier.

22. The phase change ink of claim 21, wherein $X_1$, $X_2$, $X_3$, $X_4$ and $X_5$ are fluorine atoms.

23. The phase change ink of claim 21, wherein m is an integer of from about 9 to about 50.

24. The phase change ink of claim 21, wherein n is an integer of from about 5 to about 25.

25. The phase change ink of claim 1 having a static coefficient of friction less than 0.375.

* * * * *